June 16, 1964  J. M. SPENCER, JR  3,137,164
ELECTRICALLY OPERATED MARINE SPEEDOMETER-ODOMETER
Filed June 26, 1961
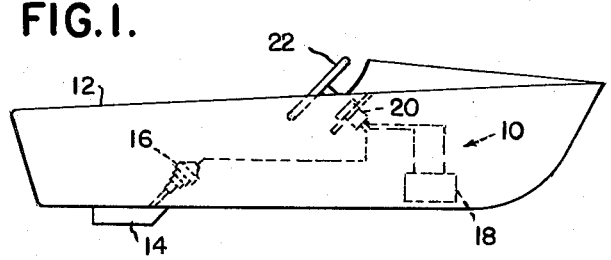
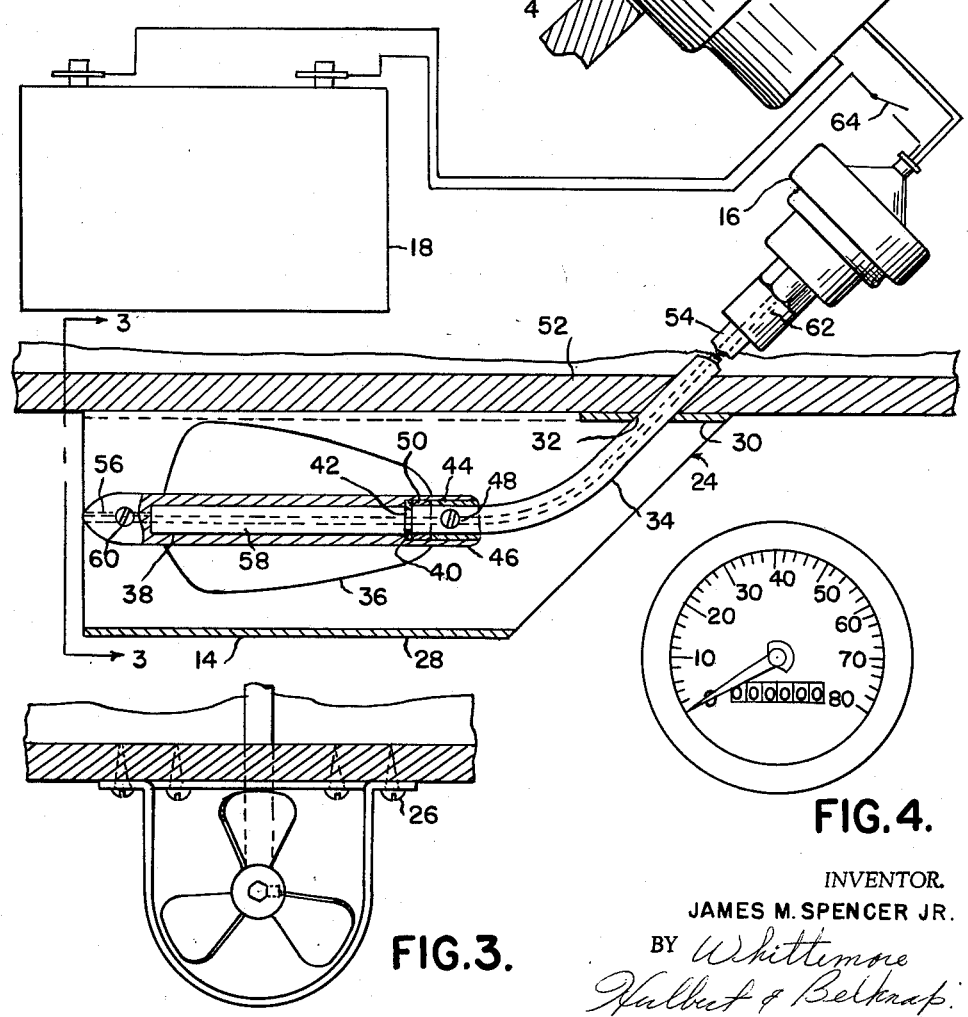
INVENTOR.
JAMES M. SPENCER JR.
BY Whittemore
Hulbert & Belknap
ATTORNEYS

United States Patent Office 3,137,164
Patented June 16, 1964

3,137,164
ELECTRICALLY OPERATED MARINE
SPEEDOMETER-ODOMETER
James M. Spencer, Jr., 2515 Mercedes Drive,
Fort Lauderdale, Fla.
Filed June 26, 1961, Ser. No. 119,583
2 Claims. (Cl. 73—187)

The invention relates to movement sensing and indicating apparatus and refers more specifically to electric means for indicating the speed and distance traveled of a boat actuated by remotely located apparatus for sensing movement of the boat and producing an electrical signal proportional thereto.

In the past, the location of means, such as speedometers and odometers for indicating the speed and distance traveled of a boat has been limited due to errors produced in such indications when long mechanical linkages between a remotely located movement sensing unit such as a ship's log and a more conveniently located indicator are used. Further, where means capable of providing an accurate indication of boat speed and distance traveled on an indicator located remote from a sensing unit have been provided in the past, they have been complicated, unreliable and expensive.

It is therefore one of the purposes of the present invention to provide improved means for sensing and indicating movement of a boat.

Another object is to provide in combination with a boat a remotely located means for sensing movement of a boat and developing a signal proportional to such movement and readily accessible means for indicating movement of a boat connected to the means for developing the signal which is located remotely from the sensing means and signal developing means.

Another object is to provide in combination with a boat a conveniently located electric speedometer and odometer for indicating the speed and distance traveled of the boat, a ship's log for producing a rotary motion proportional to the movement of the boat, a source of electrical energy carried by the boat, and an electric switch or generator connected to the source of electrical energy and speedometer and odometer and secured to the ship's log for rotation thereby at a remote location with respect to the electric speedometer and odometer.

Another object is to provide apparatus as set forth above and further including a rigid tube extending through the boat on the inner end of which the electric switch is secured and a flexible cable extending through the tube connecting the ship's log and electric switch or generator.

Another object is to provide means for sensing and indicating the movement of a boat as set forth above which is simple in construction, economical to manufacture and efficient in use.

Other objects and features of the invention will become apparent as the description proceeds, especially when taken in conjunction with the accompanying drawing.

FIGURE 1 is a diagrammatic illustration of a boat and the movement sensing and indicating apparatus of the invention in combination therewith.

FIGURE 2 is an enlarged diagrammatic view of the the movement sensing and indicating apparatus of the invention shown in FIGURE 1.

FIGURE 3 is an end view of the ship's log taken in the direction of arrows 3—3 of FIGURE 2.

FIGURE 4 is a view of the face of the indicator illustrated in FIGURE 2 taken on line 4—4 of FIGURE 2.

With particular reference to the figures of the drawing, one embodiment of the present invention will now be disclosed.

As shown best in FIGURE 1, the sensing and indicating apparatus generally designated 10 of the invention is mounted in boat 12. The sensing and indicating apparatus 10 includes the ship's log 14 best shown in FIGURES 2 and 3 mounted in a remote location on the boat 12, an electric switch or generator 16 similarly mounted in a remote location on boat 12, and the boat battery 18. Indicating apparatus 10 further includes the electric speedometer and odometer 20 which is connected to the battery 18 and the generator 16 as shown best in FIGURES 2 and 4. It will be particularly noted that the speedometer and odometer 20 is conveniently located adjacent the steering wheel 22 of the boat while the battery 18, generator 16 and ship's log 14 may be remotely positioned.

The combination of the electric movement sensing and indicating apparatus 10 with boat 12 as shown best in FIGURE 1 permits the speedometer and odometer 20 to be positioned remotely from the ship's log 14, generator 16 and battery 18 without objectionable effects on the accuracy of the speedometer and odometer indication which would be present with excessively long mechanical connections therebetween. In addition, the flexibility of positioning the electric sensing and indicating apparatus 10 permits better balancing of the elements thereof in a boat so that the appearance and operating characteristics of the boat are improved.

More specifically, the ship's log 14 comprises a shield generally indicated 24 secured to the bottom of the boat 12 by convenient means such as screws 26. Shield 24 includes the generally U-shaped portion 28 and the connecting member 30 positioned at the leading edge thereof with respect to the normal direction of travel of the boat 12 through the water and having an opening 32 therein through which tube 34 may be passed. Shield 24 serves to protect the propeller 36 from damage due to submerged objects which might otherwise be struck thereby and to maintain a desired flow through the ship's log.

The ship's log 14 further includes the propeller 36, previously mentioned, which is rotatably secured on the end 38 of tube 34 by means of the snap ring 40 secured in annular groove 42 around tube 34 in conjunction with sleeve 44 held in position within the end 46 of the hub of the propeller 36 by means of the set screw 48. Bushing 50 is provided between the sleeve 44 and the snap ring 40 to facilitate easy rotation of the propeller 36 on the tube 34 by water passing through shield 24.

As shown best in FIGURE 2, the tube 34 extends through the bottom 52 of the boat 12 through the opening 32 in the connecting member 30 of the shield 24. The generator 16 is rigidly secured to the end 54 of tube 34 as by a threaded engagement therewith. As previously indicated, the propeller 36 is secured to the end 38 of the tube 34 and is fixedly secured to the end 56 of a flexible cable 58 by means of set screw 60. The flexible cable 58 extends axially through the tube 34 and is engaged with the electric switch 16 at the end 62 thereof.

The generator 16 is provided to develop an electrical signal proportional to the speed of rotation of the flexible cable 58 connected thereto when the switch 64 is closed. Switch 64 may be for example the ignition switch of the boat 12. Electrical switches or generators such as 16 are known in the electrical arts and will therefore not be considered in detail at this time.

For a more complete disclosure of electrical switch or generator 16 reference is made to the Stewart-Warner Corporation's Catalog No. 4187 and their electric switch No. 762R. Further reference is had to United States Patent No. 2,649,559 which discloses an electric tachometer including an electrical switch or generator, motor and indicator suitable for use in the present invention.

Similarly, indicators, such as speedometer and odometer 20, capable of indicating speed and distance of movement on reception of an electric signal proportional to the speed of movement of a device in which they are installed, are known. In this regard, reference is made to the electric speedometer, Part No. 860–N, of the Stewart-Warner Corporation. The speedometer and odometer 20 will therefore not be considered in detail herein.

In operation of the combined boat 12 and speed and distance indicating apparatus 10 of the invention, the ship's log is installed on the boat 12 in a remote location so as to be rotated by water through which the boat passes. Hence, on movement of the boat through water the ship's log 14 will produce rotary movement of the flexible cable 58. Generator 16 will thus also be rotated to produce an output signal therefrom which is proportional to the speed of movement of the boat 12.

The output signal from generator 16 is passed through the electric speedometer and odometer 20 which is mounted in a convenient position for observation by the boat operator which position may be remote from the generator 16 as shown in FIGURE 2. The electric signal passed through the speedometer and odometer 20 in accordance with the usual construction of such instrument will provide an indication of both the speed of the boat 12 through water and the total distance traveled by the boat. Such indications will not be affected by the distance between the generator 16 which is located immediately adjacent the ship's log 14 as shown in FIGURE 1 and the speedometer and odometer 20 located remotely therefrom.

The drawings and the foregoing specification constitute a description of the combined boat and apparatus for sensing and indicating the speed and distance of travel of the boat in such full, clear, concise and exact terms as to enable any person skilled in the art to practice the invention, the scope of which is indicated by the appended claims.

What I claim is:

1. In a boat having an electric speedometer and odometer and a source of electric power connected in circuit with a generator for activating the speedometer and odometer by means of the power source in accordance with rotary motion transmitted to the switch from a ship's log, a ship's log and mounting means therefor comprising a rigid hollow tube extending through the hull of the boat having an annular groove around the end thereof exterior of the boat, a flexible cable extending through the hollow tube and connected interiorly of the boat to the generator, an elongated hollow cylinder, angularly spaced apart fins on the exterior thereof for producing rotation of the cylinder in use, said cylinder having three separate progressively larger internal diameters forming annular abutments therebetween, means for securing the flexible cable in the portion of the cylinder having the smaller diameter, said hollow tube extending through the larger and into the intermediate portion of the cylinder, a snap ring positioned within the portion of the cylinder having the larger diameter abutting the annular abutment formed between the intermediate and larger diameter portions of the cylinder and retained in the annular groove around the end of the tube, a bushing positioned in the larger diameter portion of the cylinder abutting the snap ring, a sleeve also positioned in the larger diameter portion of the cylinder abutting the bushing and means securing the sleeve to the cylinder.

2. In combination a boat having an opening through the hull thereof, a hollow tube extending through the opening in the hull of the boat having an annular groove around the one end thereof external of the boat hull, a ship's log comprising an elongated hollow cylinder having angularly spaced apart fins on the exterior thereof for producing rotation of the cylinder in use, said cylinder also having three separate progressively larger internal diameters forming annular abutments therebetween, said hollow tube extending through the larger and into the intermediate diameter portion of the cylinder, a snap ring positioned within the portion of the cylinder having the larger diameter abutting the annular abutment formed between the intermediate and larger diameter portions of the cylinder and retained in the annular groove around the one end of the tube, a bushing positioned in the larger diameter portion of the cylinder abutting the snap ring, a sleeve also positioned in the larger diameter portion of the cylinder abutting the bushing and means securing the sleeve to the cylinder whereby the ship's log is secured to the one end of the tube exterior of the boat, guard means secured to the boat hull surrounding the ship's log and one end of the tube, a source of electric energy, a generator operable in conjunction with the ship's log and the source of electric energy for producing an electric signal proportional to the speed of rotation of the ship's log secured to the other end of the tube inside the boat hull, a flexible cable extending between and connected at opposite ends to the ship's log and the generator, means for securing the end of the flexible cable connected to the ship's log in the portion of the cylinder having the smaller diameter, an electric speedometer and odometer connected to the generator through a pair of conductors and to one terminal of the source of electric energy through a third conductor, a fourth conductor extending between the generator and the source of electric energy and a switch in said fourth conductor for selectively deenergizing the generator, speedometer and odometer.

References Cited in the file of this patent

UNITED STATES PATENTS

| 439,442 | Thorne et al. | Oct. 28, 1890 |
| 1,230,225 | Robertson | June 19, 1917 |
| 1,609,229 | Walker et al. | Nov. 30, 1926 |
| 2,773,383 | Kersten | Dec. 11, 1956 |

FOREIGN PATENTS

| 26,434 | Great Britain | Nov. 25, 1911 |